United States Patent [19]

Franklin et al.

[11] Patent Number: 6,115,742
[45] Date of Patent: Sep. 5, 2000

[54] METHOD AND APPARATUS FOR SECURE AND AUDITABLE METERING OVER A COMMUNICATIONS NETWORK

[75] Inventors: Matthew Keith Franklin, New York, N.Y.; Dahlia Malkhi, New Providence, N.J.

[73] Assignee: AT&T Corporation, New York, N.Y.

[21] Appl. No.: 08/762,024

[22] Filed: Dec. 11, 1996

[51] Int. Cl.[7] ................................. G06F 13/00
[52] U.S. Cl. ......................................... 709/224
[58] Field of Search ................ 395/200.54, 200.57; 709/200, 201, 203, 217, 218, 219, 223, 224, 225

[56] References Cited

U.S. PATENT DOCUMENTS

| | | | |
|---|---|---|---|
| 5,410,598 | 4/1995 | Shear | 380/4 |
| 5,493,492 | 2/1996 | Cramer et al. | 705/32 |
| 5,675,510 | 10/1997 | Coffey et al. | 395/200.54 |
| 5,696,965 | 12/1997 | Dedrick | 707/10 |
| 5,710,884 | 1/1998 | Dedrick | 395/200.47 |
| 5,721,908 | 2/1998 | Lagarde et al. | 707/10 |
| 5,781,909 | 7/1998 | Logan et al. | 707/200 |
| 5,796,952 | 8/1998 | Davis et al. | 395/200 |
| 5,892,917 | 4/1999 | Myerson | 709/203 |

OTHER PUBLICATIONS

Rogriquez, Karen, New Services Safeguard Customer Service, Interactive Enterprises, LLC, p. 2, Nov. 4, 1996.
Frost et al.: *World wide web audience measurement: Users, not "hits"*, May 1996, XP002065345, Available from Internet: <URL:http://wwwsb.ccsu.cstateu.edu/xroads/Frost.htm.
Leach et al.: *Simple hit–metering for HTTP*, Jul. 31, 1996, XP002065346, Available from Internet <URL:http://ftp.digital.com/{mogul/draft–ietf–http–hit–metering–00.txt.
Franklin et al.: *Auditable metering with lightweight security*, Proceeding, Financial Cryptography First International Conference, FC '97, pp. 151–160, XP002065347 Available from mInternet >URL:http://www.research.att.com/{dalia/.

*Primary Examiner*—Moustafa M. Meky
*Attorney, Agent, or Firm*—Kenyon & Kenyon

[57] ABSTRACT

A compact metering scheme meters visits to a web site. A proxy module intercepts traffic between a client and a server. The proxy module appends a metering module to the body of information sent from the server to the client. The metering module measures the duration of each visit using a timing function F and a unique seed generated for each visit. The metering module returns an auditable result when the client ends the visit. A log keeper module is used to store each result.

21 Claims, 7 Drawing Sheets

METHOD AND APPARATUS FOR SECURE AND AUDITABLE METERING OVER A COMMUNICATIONS NETWORK

BACKGROUND OF THE INVENTION

The invention relates generally to electronic commerce and metering. More particularly, the invention relates to a method and apparatus for automatically, securely and accurately metering the number and duration of visits to a website.

There has recently been an increase in the popularity of the Internet, and in particular, the World Wide Web (WWW). This popularity is based in part upon the rich amount and diversity of information available through the Internet and WWW. Some experts estimate that 83 million people currently have access to the WWW, and that 199 million will have access by the year 1999.

The growing popularity of the Internet and WWW is driving various applications, several of which are commercially oriented. One such commercial application of the WWW is advertising. The WWW is particularly well-suited for advertising since it offers a relatively fast and effective means of mass distributing information. The difficulty of using the WWW for advertising, however, is the need for securely metering the distribution circulation to accurately price the advertisements.

To illustrate this difficulty, a short description of how information is organized on the WWW may prove helpful. A fundamental logical grouping of information used in the WWW is a hypertext file. A hypertext file is typically written in a programming language such as Hypertext Markup Language (HTML). An individual uses a browser on a computer to display a hypertext file in the form of a page. A page comprises information in various forms, such as text, graphics, images, video or sound.

One or more links may be embedded in each page. A link is a logical connection to information or programs located at a predetermined address on the Internet. This predetermined address is referred to as a Universal Resource Locator (URL). By selecting a link, a user can cause the browser to display a different portion of the same page, display a different page (known as the linked page), expand an image, execute a computer program, and so forth.

A logical grouping of hypertext files (i.e., pages) is called a site. Sites may reside on different computers. A set of sites that are interconnected by links is referred to as a web. A site on a first computer may be effectively linked to a site on a second computer by connecting the first and second computers through a network. The WWW is an example of a set of sites residing on different computers interconnected by a network.

The WWW can therefore be loosely defined as a set of sites storing hypertext files written in HTML on computers interconnected by the Internet. Each site on the WWW is known as a website. A website resides on a computer known as a server, which is accessed through a network by a user utilizing a client computer and a browser located at the client computer.

The term client computer as used herein refers to a system with a microprocessor and means for storing data and/or software such as random access memory and/or a hard disk drive, and which is capable of communicating with a network. The client computer is capable of providing output for display to a user, for example through a video display. Such output may take the form of at least one of textual, graphic, animation, video, audio, or virtual object media. The client computer is also capable of accepting input from a user. Such input may be provided by means such as a keyboard, a mouse, a telephone touch pad, a television remote control, and so on.

Similarly, the term server computer as used herein refers to a system with a microprocessor and means for storing data and/or software such as random access memory and/or a hard disk drive, and which is capable of communicating with a network. Typically, a server is more powerful than a client in that it has greater processing power or larger amounts of static or dynamic memory.

Much effort is spent on understanding Internet usage, and determining what units of measure are appropriate for metering client visits. A problem of equal, if not greater, concern, however, is that of ensuring the security of the process by which access data is collected and transferred.

The absence of secure metering greatly impacts advertising revenues. Access data is usually collected at the server site, which has control over the collecting process as well as over stored data. Since the owner of the server can charge higher rates for advertisments by showing a higher number of visits, the owner has a strong economic incentive to inflate the number of visits. The owner could accomplish this by manipulating any unsecured metered data stored on the server.

Alternatively, any individual could fraudulently increase the number of visits to a web site using a "robot." As used in reference to the Internet, a "robot" is a computer program which is configured to generate visits to a web site. The amount of visits is theoretically limitless. Further, these visits could be made untraceable. A robot's creator could even make it appear that the visits are from a diverse group of clients.

In view of the above, it is clear that a need exists for accurately and securely metering vists to a web site. Conventional schemes, however, are unsatisfactory in many ways.

For example, one possible solution is to employ metering methods typically used for traditional mass-distribution media, such as radio broadcasts, television and newspapers. These conventional metering methods, however, do not translate easily on the WWW. For example, customer surveys such as the Nielsen ratings have served the television industry for decades. Polling customers about web site visits, however, poses severe difficulties given the vast amount and fast-changing nature of information offered on the WWW. As another example, daily newspapers effectively track circulation by charging customers for each newspaper. In the Internet realm, however, this is far less effective since customers have historically expected free access to information on the Internet.

Another possible solution is to employ standard cryptographic methods to keep self-authenticating records of interactions on the WWW secure. This could be accomplished using existing extensions to the WWW protocols, such as secure hypertext transfer protocol (S-HTTP) and secure socket layer (SSL) protocol. Secure HTTP is an extension of HTTP providing security service for transaction authenticity, integrity and non-repudiability of origin. The SSL protocol is a security protocol for the Internet that mandates server's authentication, allows optional client authentication, and provides services for private communications between clients and servers. The problem with these methods, however, is that they require authentication of all clients. Every client must register to obtain authentication keys. Not only is this a heavy administrative burden, but it leads to solutions that threaten the client's privacy.

A third possible solution is to meter visits to websites using an online third party census. Audit Bureau of Circulations (ABC) offers such a service. A third party census can independently provide measurements on web activity. Using this scheme, an objective authority can monitor metering activity. This authority can then certify the measured data from such activity. This certification minimizes the possibility of manipulation by a self-serving web publisher. A problem with this method, however, is the dependence on a central authority. If the central authority is compromised, the results of the audit will be suspect. Moreover, an online third party census incorporates the inaccuracy inherent in any census method, thereby making it difficult to determine the deviation of census activity from real activity, i.e., how much fraud has actually occurred.

Another deficiency of conventional metering schemes is that they fail to solve the proxy problem. The proxy problem results from the failure to accurately meter the number of visits to web pages from a particular web site which have been temporarily stored in a cache or on proxy servers.

A cache is used to temporarily store hypertext files to minimize conection time to a web server. In a typical WWW transaction, the client computer connects to a server computer and requests certain information stored on the server. The server in turn downloads the information to the client computer's local memory or a cache. Once the client receives the requested information, the client disconnects from the server. The customer using the client computer may then review the information at his or her leisure.

A similar problem occurs with proxy servers. A company may want to isolate their local network from external computers and networks for security purposes or to prevent the infection of the company network from viruses. The company may accomplish this by building a "firewall." The company would route all connections to computers outside the company's network through a central site. Any information downloaded from outside the company network would be stored at a central server, sometimes referred to as a proxy server. In turn, various client computers located on the company's network can access the information from the proxy server, without having to actually connect to the external server which originally provided the information.

Hypertext files stored in a cache or proxy server can be visited any number of times by any number of client computers without the server's knowledge. Conventional metering schemes are incapable of metering these visits, except through extrapolating an estimated amount from metered visits. The number of proxy visits, however, can account for a significant percentage of the overall number of visits to the content from a particular web site.

Metering visits to websites is also necessary for commercial applications other than advertising. For example, customers may choose to connect to the WWW through an Internet Service Provider (ISP). ISPs typically charge their customers for connections to the WWW by the hour. An ISP may enhance service to customers by having sites referred to as partners that provide information on the WWW and assume the charges of clients connections to such sites. This would be similar to companies which assume the phone charges of calls to "800 numbers" in the United States. A secure metering scheme would enable ISPs to accurately record the number and duration of client visits that pass through the ISP to the partner site, and use this record to reverse-charge the partner site.

Another example of the need for a secure metering scheme can be illustrated with respect to copyrighted material stored on the Internet. Some web sites post copyrighted material, such as art work or music excerpts, and are therefore required to pay royalties to the copyright owner(s). A secure metering scheme would prevent copyright owners from fraudulently inflating visits to the web site in an attempt to increase their own royalty payments.

A secure and accurate metering scheme is also important for "popularity" polls. There are a number of web sites which rank other web sites according to the number of visits to each site. These popularity polls are important for marketing a web site, and also for pricing advertisments for a site. A secure and accurate metering scheme would ensure proper rankings. Further, the rankings would be far more accurate if they could reflect not only the number of visits, but the duration of each visit as well. Current metering schemes fail to accurately and securely accomplish either function.

In view of the foregoing, it can be appreciated that there exists a substantial need for a secure and accurate metering apparatus and method to solve the above-discussed problems.

SUMMARY OF THE INVENTION

The invention automatically, securely and accurately records the number and duration of visits to a website using a compact metering scheme. More particularly, the invention uses a timing function, a unique seed, and the computational power of the client to ensure secure and accurate metering. The term "visit" as used herein refers to the length of time, or elapsed time, a client reviews or examines information or content from a particular web site.

The invention uses a metering protocol which relies upon the difficulty in computing visit records to leverage auditability. The metering protocol employs a timing scheme which requires an investment of a client's computation power that can be estimated to within some known accuracy. Since the timing scheme requires a known investment of computational resources which grows proportionally to the scale of forgery, the metering protocol makes the forging of visit records extremely difficult. Thus, mass fraud through the use of robots or other means is prevented.

The invention comprises a compact metering scheme for metering a visit to a web site. The invention uses a proxy module for intercepting traffic between a client and a server. The proxy module appends a metering program to the body of information sent from the server to the client. The metering program measures the duration of each visit using a timing function F and a unique seed generated for each visit. The metering program returns an auditable result when the client ends the visit. A log keeper module is used to store each result.

The invention does not require registration by WWW customers, or a change in the manner by which the customers access the WWW. Any client running a JAVA-enabled WWW browser automatically participates in the metering scheme used in the invention.

The invention records every client visit, whether the user obtains the content from the original website or from any intermediary cache or proxy server. Thus, the invention captures any visits by clients behind firewalls.

The invention requires no change or registration of website pages. A transparent webmeter placed on the web server performs the metering on all accesses to the web site.

The invention imposes reasonable computation and storage requirements at both the client and server sides.

The invention does not require registration by a client. Thus, the invention maintains client privacy.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The invention uses a timing scheme which requires an investment of a client's computation power that can be estimated to within some known accuracy. The invention uses this estimation to auditably measure the duration of a visit.

The invention implements the timing scheme by inserting itself within a visiting protocol used to establish communications on the Internet. A visiting protocol is described in detail below.

Visiting Protocol

When a client wants to connect to a server on the WWW, it typically must use an external visiting protocol recognized by the network. In the present embodiment, it is assumed that the visiting protocol is the HTTP protocol. Other visiting protocols, however, fall within the scope of the invention.

Figure 1:
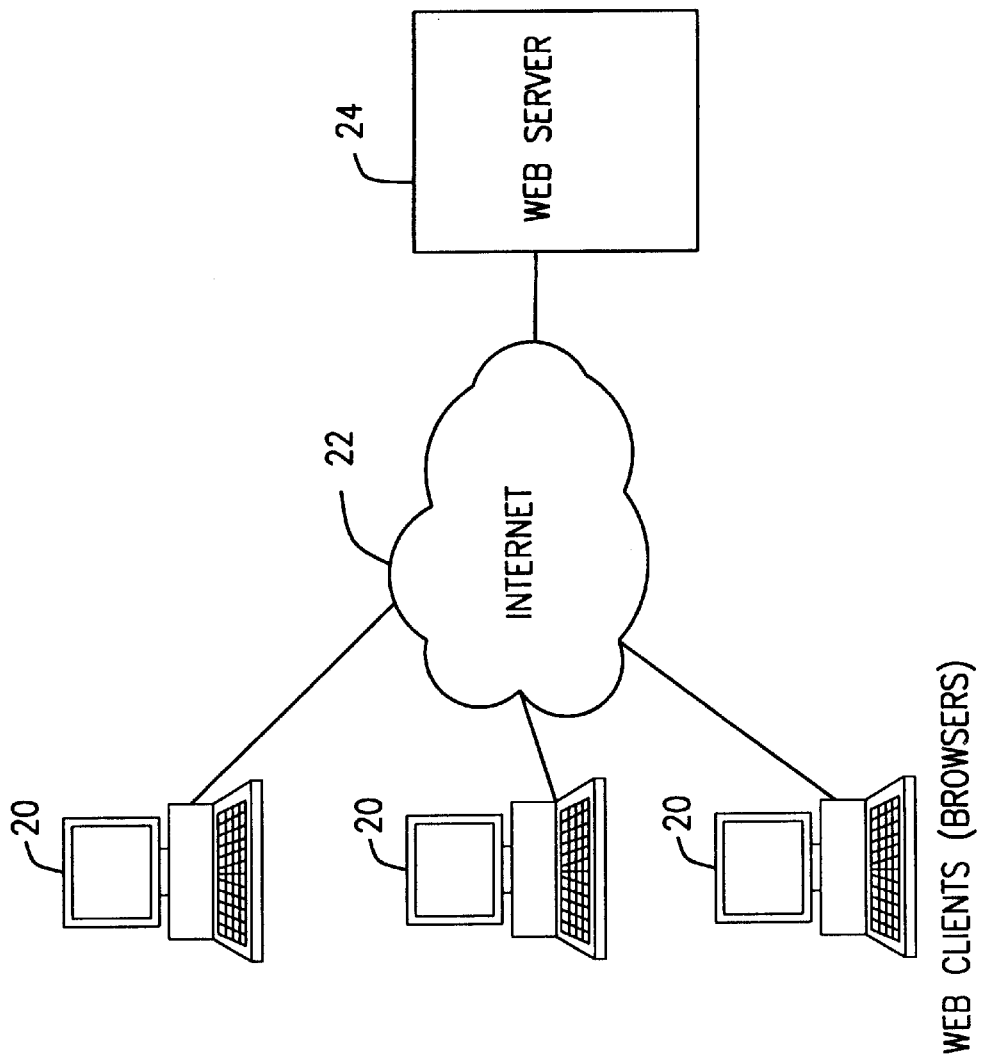
FIG. 1 is a diagram of the Internet.

FIG. 1 shows a diagram of the Internet. FIG. 1 shows client computer 20 attached to web server 24 through Internet network 22.

Figure 2:
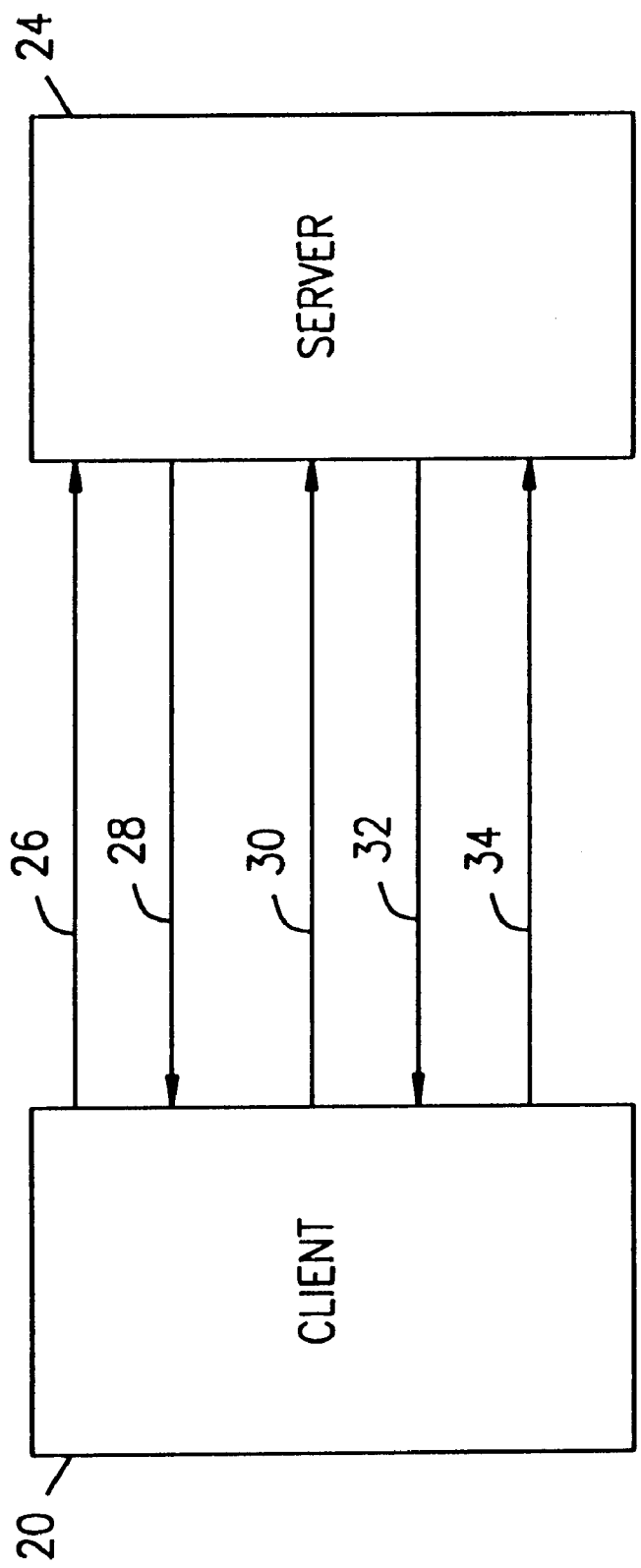
FIG. 2 is a message flow diagram of a typical HTTP protocol used in accordance with an embodiment of the invention.

FIG. 2 is a message flow diagram in accordance with a typical HTTP visiting protocol. Client 20 issues a TCP/IP request to server 24 shown at step 26. Once the TCP/IP connection is set up at step 28, client 20 sends a GET message to server 24 at step 30. The GET message identifies the specific content requested, path name, source IP address, and other information. Once server 24 receives the GET message, the server sends the requested content to client 20 at step 32. Once client 20 receives the content, client 20 disconnects from server 24 at step 34. At some later point, client 20 finishes reading the web page and clicks away (using the browser).

The present embodiment of the invention superimposes a metering protocol on the visiting protocol by inserting a webmeter in the communication path between the client and the server. The webmeter can reside on the server and hide the server from the rest of world. Thus, the client communicates with the webmeter as if the webmeter were the server. The flow of information between the client and the webmeter is detailed in a metering protocol described below.

Metering Protocol

Assume that c denotes a client, and m denotes a webmeter. Webmeter m communicates with client c using a reliable first-in-first-out (FIFO) communication channel. Assume that m and c engage in a visiting protocol whose details are opaque, that generates two events. The first event is a start-visit event. A start-visit at m signals the beginning of the visiting protocol at m, and precedes any information sent from m to c. The second event is an end-visit event. An end-visit at c signals the termination of the visiting protocol at c. Following the end-visit event, c does not send any further information to m within the visiting protocol.

Futher assume that the network environment supports dynamic deployment of programs from m to c, with the following properties: m is capable of sending an executable metering program p to c, which c may then choose to execute. Client c may send a termination signal to p as it executes, or can terminate it (ungracefully). Metering programs deployed from m to c may utilize computational resources and may communicate back and forth with m.

The purpose of the metering protocol is to maintain at m a record of c's visit, expressing the duration of the visit, i.e., the time between the start-visit and end-visit events. For a webmeter m to record the duration of a client c's visit with a timing scheme $<F, \mu>$, m and c engage in the following protocol.

1. Intitiation

When m incurs a start-visit event by c, m deploys a metering program p that, when executed by c, computes F during its runtime. When signalled to stop, p sends back the result to m and terminates. Metering program p (equivalently F), is initilized at m prior to deployment with the following cookie: $<m, ts>$, where ts is a unique identifier (timestamp) used once by m, and with the property that $ts_2 \neq ts_1$ for any two distinct cookies $<m, ts_1>$, $<m, ts_2>$.

The metering program p may contain a bounded computation of F or run endlessly. In the former case, if termination is reached then the computed result is sent back to m. In the latter case, the metering program terminates by a stop signal (discussed below), or when destroyed.

2. Execution

When a client c receives p it starts executing it.

3. End

When a client c incurs an end-visit event, it signals p to stop. If p is still running, p responds to this signal by terminating the computation of F and sending the computed result back to m. This computed result is evaluated, or audited, using the auditing scheme described in detail below.

Auditing Scheme

Assume that $<F, \mu>$ is a $\gamma$-timing scheme. A visit record has the form rec=[m, ts, z] where z=F(m||ts). To interpret a collection of visit records rec1, . . . , recn, the auditor computes $\Sigma_i \mu(z_i)$. Large-scale fraud cannot gain more than a factor of $\gamma$ beyond the differences in computing speed.

The number of visit records stored at a webmeter site could be reduced by storing only those records which satisfy some predicate P. The predicate should have a predictable success rate, but be hard to predict for individual inputs, e.g., $P_{h,q}(rec)$ is true if and only if h(rec) mod q=0. The auditing scheme verifies that all stored timing records satisfy the predicate, and expands the timing interpretation according to the success rate (e.g., multiply by q for $P=P_{h,q}$).

An Advantageous Embodiment Of The Invention

Figure 3:
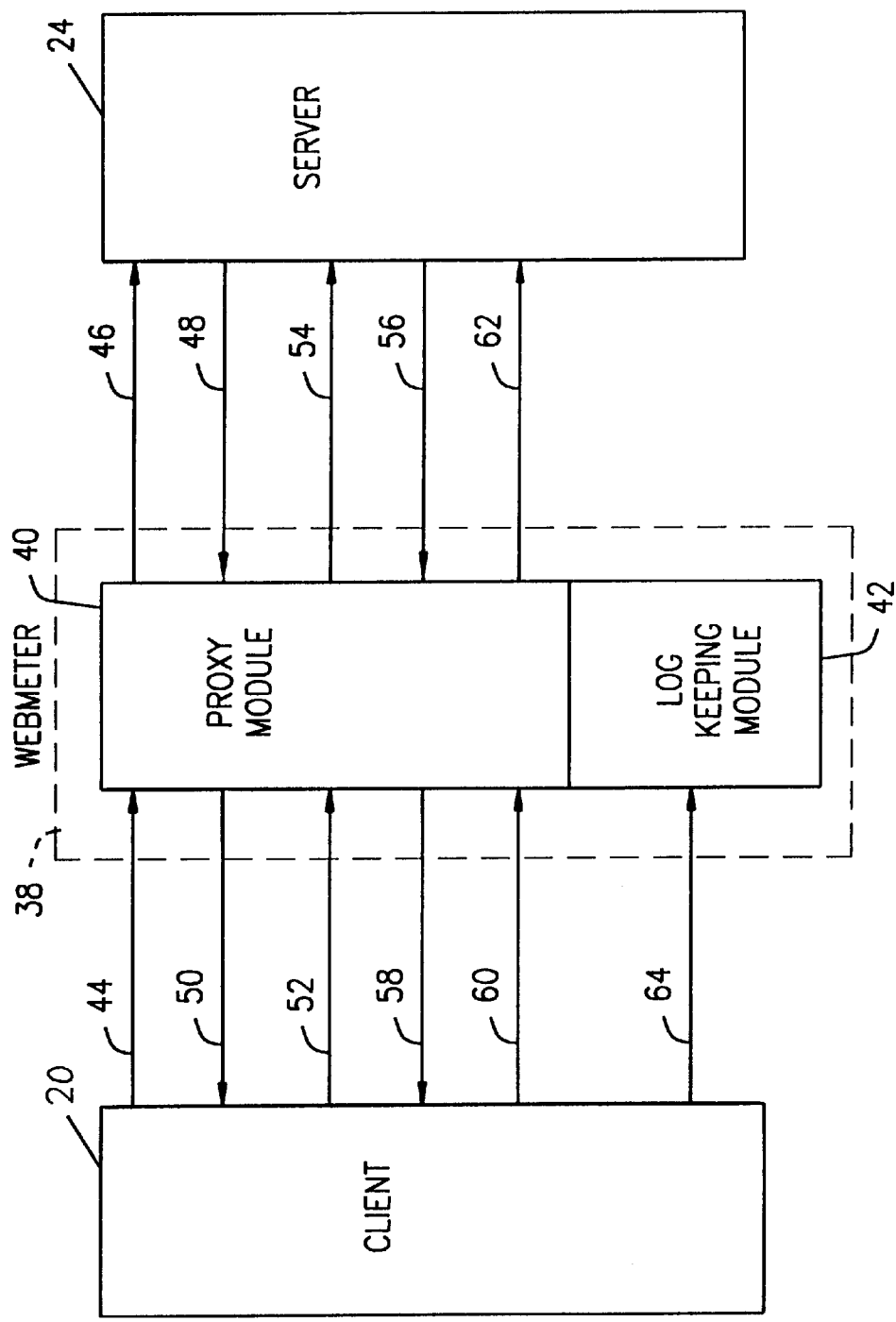
FIG. 3 is a message flow diagram of a metering protocol used in accordance with an embodiment of the invention.

FIG. 3 is a message flow diagram of a metering protocol used in accordance with an embodiment of the invention. FIG. 3 shows client 20 connected to server 24 through webmeter 38. Webmeter 38 comprises two modules, the first being proxy module 40 and the second being log keeping module 42.

As shown in FIG. 3, client 20 issues a TCP/IP request to server 24 which is intercepted by webmeter 38 at step 44. Webmeter 38 sends a request for a TCP/IP connection to server 24 at step 46. Once the TCP/IP connection is established with webmeter 38 at step 48, webmeter 38 establishes a TCP/IP connection with client 20 at step 50. At step 52, client 20 sends a GET message to server 24 which is intercepted by proxy module 40 of webmeter 38. Proxy module 40 sends the GET message to server 24 at step 54. Once server 24 receives the GET message, the server sends the requested content to proxy module 40 at step 56. Proxy module 40 attaches a metering program to the requested content and assigns a cookie having a unique seed. Proxy module 40 forwards the content and metering program to client 20 at step 58. At client 20, the metering program begins calculating timing function F using the unique seed in the cookie in response to a start visit event initiated by client 20. After client 20 receives the content, client 20 disconnects from server 24 at step 60, followed by proxy module 40 disconnecting from server at step 62. At some later point, client 20 finishes reading the web page. The metering program ends in response to an end visit event initiated by the client, e.g., when the client finishes reading the web page and clicks away. The metering program returns an auditable result to log keeping module 42 of webmeter 38 at step 64. Log keeping module 42 audits the result derived from computing timing function F using the unique seed in the cookie to determine whether the result is authentic and not a forgery.

It is worthy to note that proxy module 40 may be placed on the same host as web server 24 and hide web server 24 from the world. Proxy module 40 may also be placed anywhere else on the communication path between client 20 and server 24.

The invention uses the difficulty of computing the timing scheme to leverage the security of the metering scheme by involving each client in computing a timing function F using a unique seed, and recording the result of the computation along with the record of the visit. The invention measures the duration of the visit by causing the client to compute the timing function F incrementally throughout the duration of the visit, and returning the output when the client performs an end visit event. Since the timing scheme is incremental, webmeter 40 is capable of determining how many calculations the client performed. By multiplying the number of calculations by the known time for each incremental calculation, the duration of the visit is captured.

Thus, to forge client visits requires a known investment of computational resources, which grows proportionally to the amount of fraud. Since the client computes timing function F using a unique seed, the number of calculations and known time for each incremental calculation will change for every visit. This ensures that the calculation output cannot be reproduced. This is particularly true given the large number of visits commonly found on the WWW.

Figure 4:
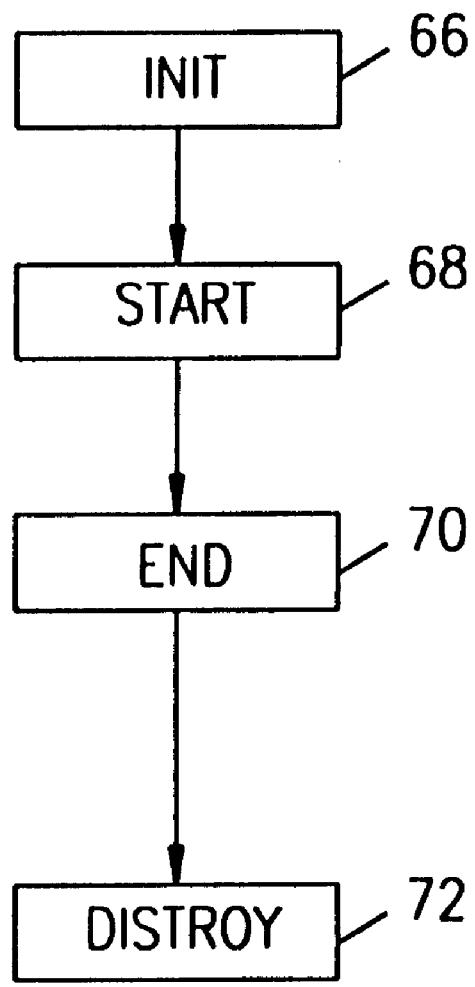
FIG. 4 is a block flow diagram of a typical JAVA applet used in accordance with an embodiment of the invention.

FIG. 4 is a block flow diagram of a typical JAVA applet used in accordance with an embodiment of the invention. As shown in FIG. 4, a metering program written as a JAVA applet is attached to the content at step 58. The JAVA applet is initiated at step 66. At step 68, the JAVA applet receives a start visit event and begins computing an incremental, compact timing scheme F using the unique seed assigned by the proxy module 40 of webmeter 38 to this particular visit. At step 70, the JAVA applet stops the timing function F in response to an end visit event or when it meets a predetermined upper boundry. The JAVA applet sends an auditable result to log keeper module 42 when the timing function is stopped. The JAVA applet is destroyed at step 72.

Solving The Proxy Problem

Figure 5:
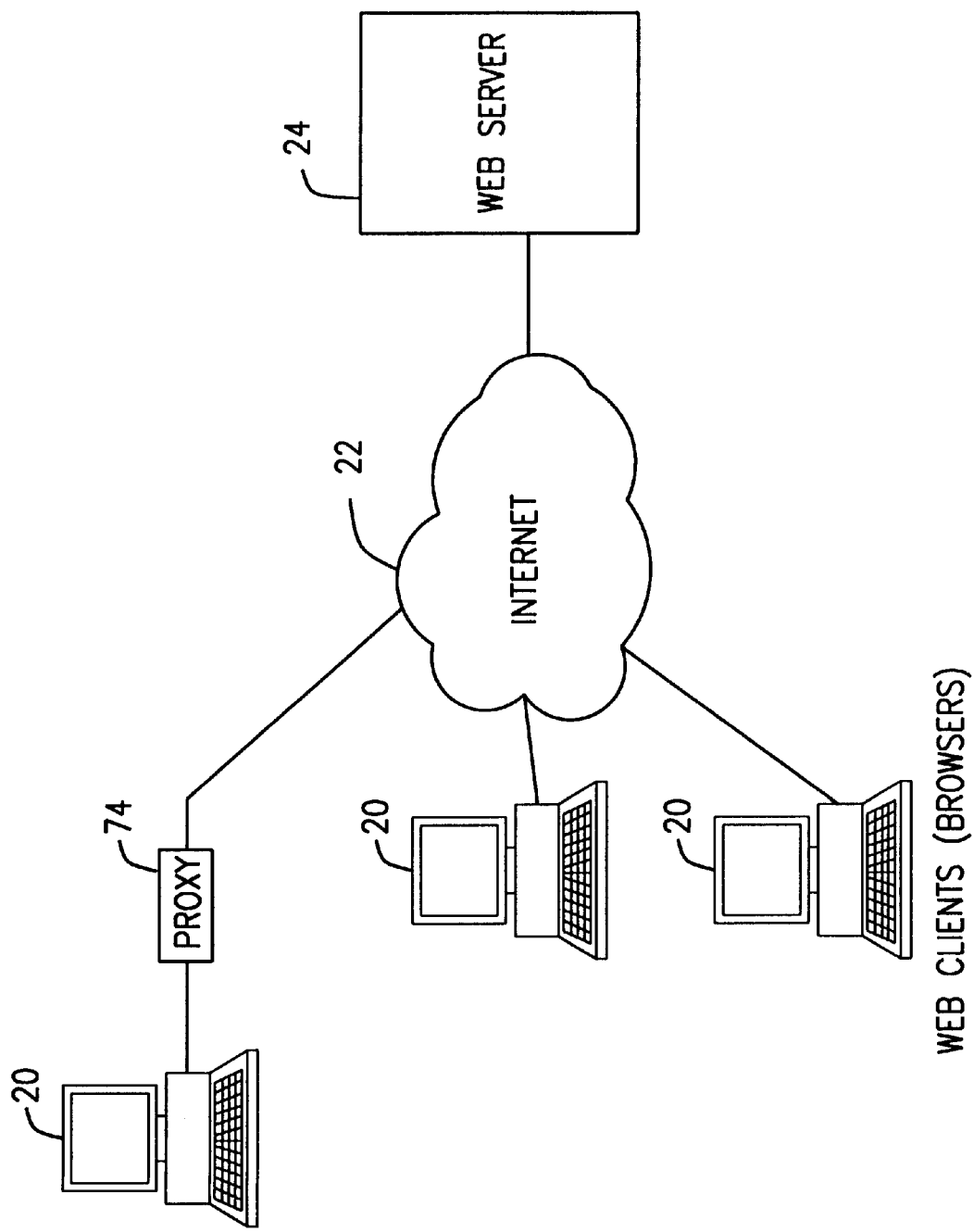
FIG. 5 is a block system diagram of the WWW using a proxy or intermediary cache to temporarily store information from a web server.

FIG. 5 is a block system diagram of the WWW using a proxy or intermediary cache to temporarily store information from a web server. FIG. 5 shows client 20 connected to server 24 through Internet 22. Proxy server 74 resides between Internet 22 and client 20 and stores information from server 24 requested by client 20.

Figure 6:
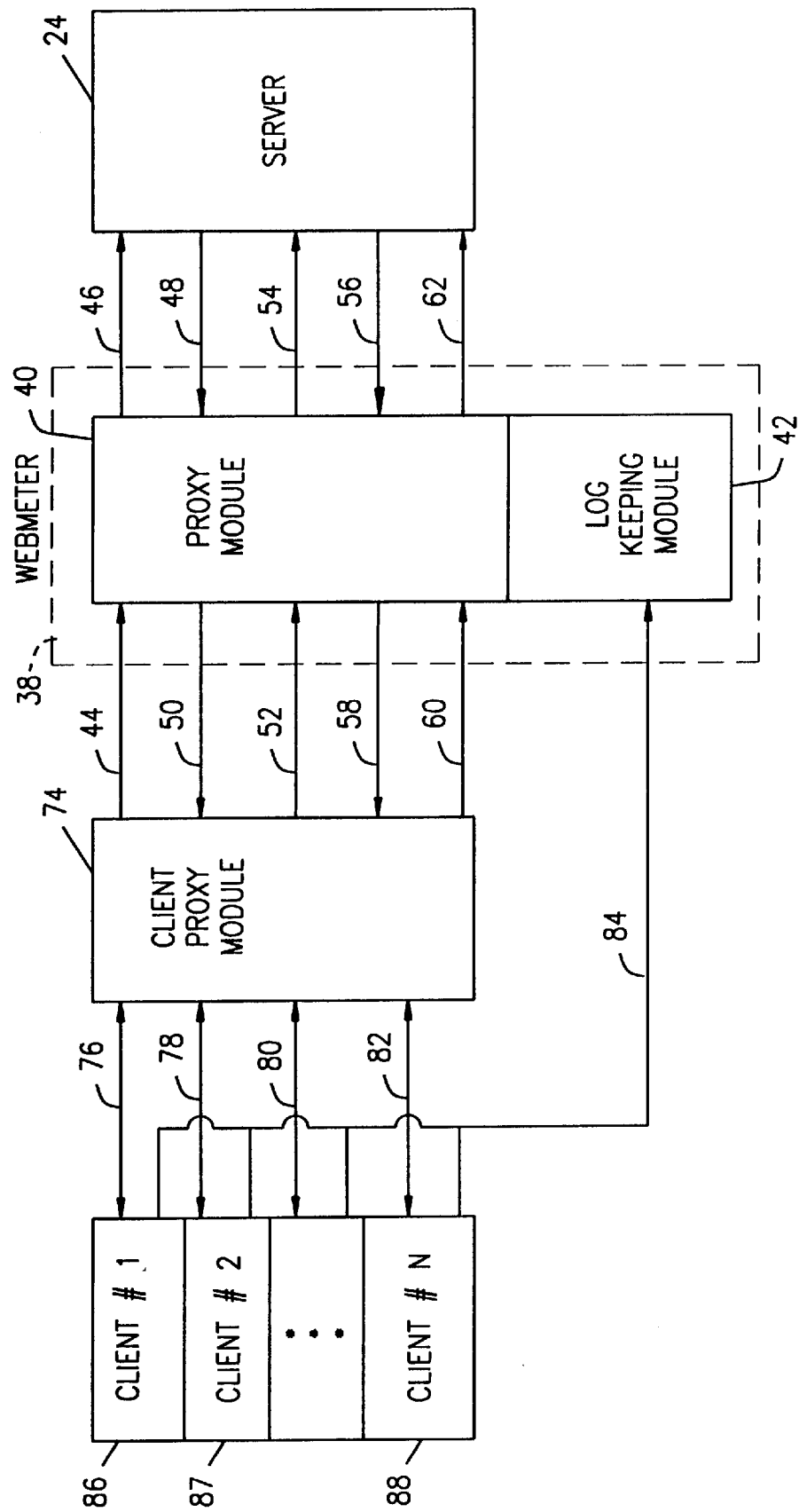
FIG. 6 is a block system diagram using a client proxy module in accordance with an embodiment of the invention.

FIG. 6 is a block system diagram using a client proxy module in accordance with an embodiment of the invention. FIG. 6 shows a client proxy module 74 in communication with web server 24 through webmeter 38. The steps shown in FIG. 6 are similar to those shown in FIG. 3. The difference in FIG. 6, however, is that all communications between a client and a server not only pass through webmeter 38, but also through client proxy module 74. When a client such as client 86 requests information from server 24, it does so through client proxy module 74 at step 76. Client proxy module 74 checks to see if the information requested by client 86 is cached at client proxy module 74. If not, client proxy module 74 requests the information from server 24 using steps 44, 46, 48, 50, 52, 54, 56, 58, 60 and 62, which are the same as those discussed with reference to FIG. 3. If the information is cached at client proxy module 74, client proxy module 74 does not interact with server 24, but rather provides a cached copy of the information to client 86 in a step analogous to step 58 discussed with reference to FIG. 3. Since the JAVA applet (i.e., the metering program) attached to the cached information contains the origin source address, i.e., the webmeter's address, when client 86 is finished with the information, the result of the timing computation returns to webmeter 38 at step 84, despite server 24 not being involved in the visit. Step 84 occurs for any client (e.g., client 1 through client N shown at 86, 87 and 88) requesting cached content from client proxy module 74.

Figure 7:
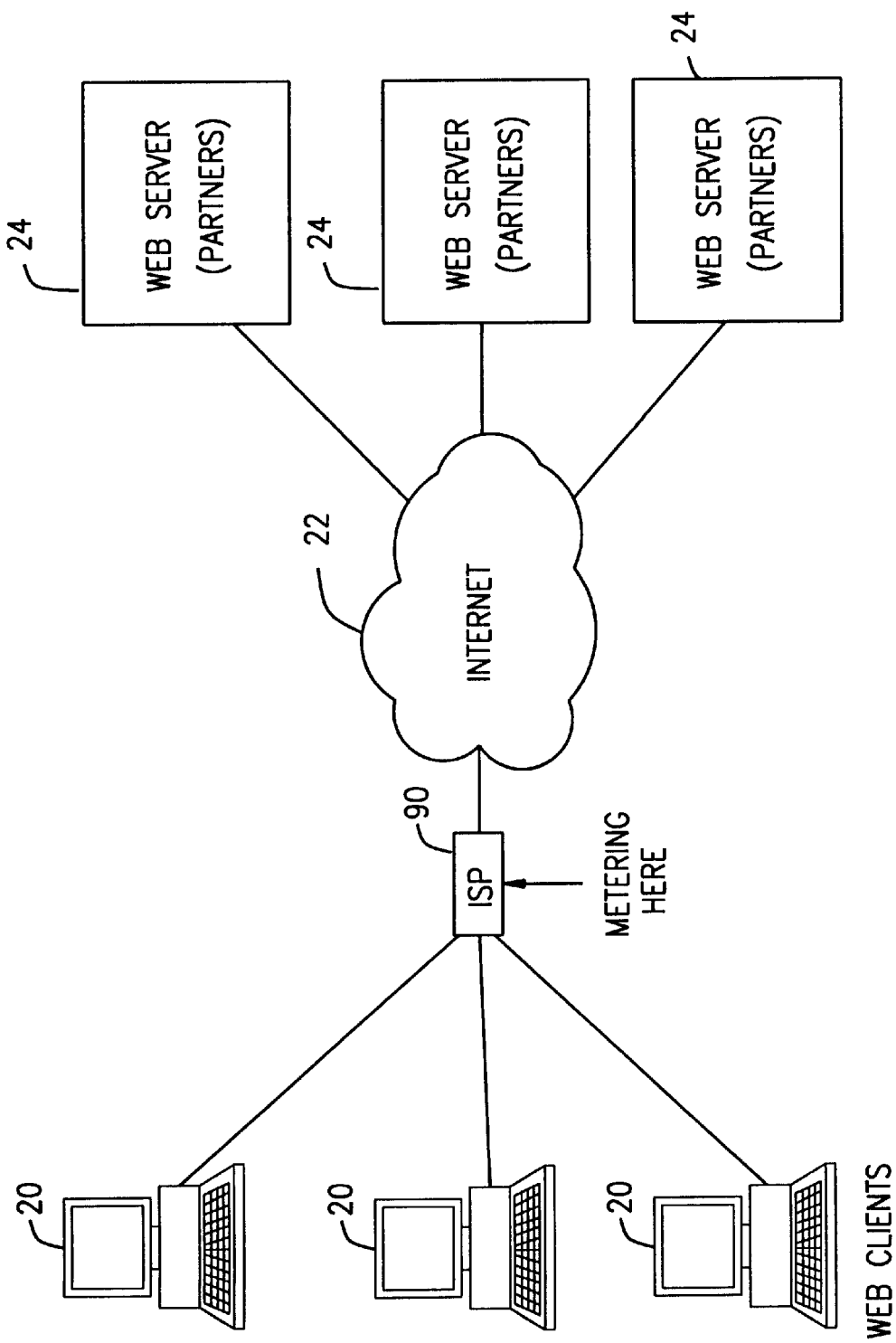
FIG. 7 is a block system diagram using an ISP in accordance with an embodiment of the invention.

FIG. 7 is a block system diagram using an ISP in accordance with an embodiment of the invention. FIG. 7 shows client 20 connected to web server 24 through Internet 22. ISP 90 is located between Internet 22 and client 20. A webmeter in accordance with the present invention can be placed at ISP 90. Since ISPs typically charge their customers for connections to the WWW by the hour, ISP 90 may enhance service to customers by having partner sites that provide information on the WWW assume the charges of clients connections to such sites. This would be similar to companies which assume the phone charges of calls to "800 numbers" in the United States. By placing the webmeter at ISP 90, ISP 90 is capable of automatically, securely and accurately metering all visits made through ISP 90 to partner sites, and use this record to reverse-charge the partner site.

Timing Scheme

The invention uses a timing scheme which requires an investment of a client's computation power that can be estimated to within some known accuracy. The invention uses this estimation to auditably measure the duration of a visit. A timing scheme used in one embodiment of the invention will now be described in more detail herein.

An appropriate timing scheme for use with an embodiment of the invention has the following properties: (1)

incremental; (2) compact; (3) accurate; and (4) uncheatable. Incremental means that the timing scheme can be computed with increasingly large efforts invested. Compact means the output of the timing scheme need not grow with the amount of effort spent. Accurate means the effort spent can be estimated closely from the output. Uncheatable means there exists no method for producing the output of the timing scheme with considerably less effort than the timing scheme itself.

The timing scheme consists of two components. The first is a timing process, which is an incremental computation performed by a client. The result is sent back to the server. The second is an auditing function that estimates the computation time spent producing the logged result. Computation time is expressed in terms of some agreed upon unit of computation, whose complexity is well-analyzed.

Two sources of imprecision may cause the auditing function to deviate from the actual computation time spent. The first is the inherent inaccuracy of the auditing function, on average, with respect to the real effort spent in the timing process. The second is the extent to which another "cheater" process may improve the average time spent to compute the results. The appropriateness of the timing scheme for use with the metering scheme is the overall precision of the estimate. It is worthy to note that there may exist several auditing functions for any particular timing process, typically trading efficiency with precision.

The basis for a timing process is a grain of computation, denoted h, that has the following two properties:

1. The computation complexity of h is well understood, i.e., a known amount of computation is required for computing h, and no other means are known today to compute values of h with less computing investment.

2. Grain h is a cryptographically ideal hash function, i.e., given y, it is infeasible to determine an x such that h(x)=y. Furthermore, the values h takes are uniformly distributed, such that any outcome in the range of values of h is equally likely to occur.

The idea of a timing process is to employ an increasing number of computations of h as the process goes on, and when it stops, produce a fixed length result. Since the outcome of h is unpredictable, performing k evaluations of h is equivalent to drawing k numbers at random from the space of possible values of h. To reduce these numbers to a fixed-length result, we choose the l smallest values thus obtained as the result of the computation (where l is fixed for any timing scheme). Intuitively, the more values of h are computed, the smaller we expect the final l minimum values to be. This intuition is turned into a precise prediction below.

Moreover, given a set of l minimal values resulting from an unknown number of h computations, there is a likely number of k that is the best estimate of the effort spent (in terms of the number of h computations). This estimator can, on average, estimate the real effort spent to a well known accuracy. In this way, an auditor may look at the results of the computation of timing processes and estimate, to a known accuracy, the time spent in them. We note that while an estimate may vary considerably from the correct number of h computations in any particular incident, it will be reasonably accurate over the long run, where many such computations are performed.

A formal definition for a timing scheme and the details for one family of constructions used with an advantageous embodiment of the invention is provided as follows.

Assume h is a cryptographically ideal hash function, i.e., like a random oracle. The timing scheme will be measuring time in terms of the number of computations of h that are performed, so the computational complexity of h should be well understood. Assume that a (probabilistic) function f is built from h so that the bulk of the work in evaluating f is devoted to evaluating h. Let such a function be called an "h-function." Let #(f) denote the expected number of evaluations of h in the valuation of f(x), where the expectation is over the coin flips of f and the choice of x from the domain of f.

Let $\{f_k\}$ be a family of h-functions, $f_k: D_K \rightarrow R_k$, from domain $D_k$ to range $R_k$, such that #($f_k$)=k. Let $\mu: (U_k R_k) \rightarrow Q+$ be a function from the range spaces of $\{f_k\}$ to the positive rationals. Intuitively, $\mu$ is to serve as an auditing function that attempts to estimate the number of evaluations of h that were needed to compute some $f_k(x)$, i.e., to estimate k from the result of $f_k(x)$, A "cheater" is an h-function g that, on empty input, outputs some number of pairs $(x_i, y_i)$ such that all of the $x_i$ values are distinct, and such that each $y_i \leftarrow f_{ki}(x_i)$.

The timing scheme $F = <\{f_k\}, \mu>$ is considered "$\alpha$-accurate" if $\alpha k \leq E[\mu(y): y \leftarrow f_k(x)] \leq k$ for all k, where the expectations are over the coin flips of $f_k$ and the choice of $x \in D_k$. The accuracy is "up to D" if the requirement holds for all $k \leq B$.

The timing scheme $<\{f_k\}, \mu>$ is considered "$\beta$-uncheatable" if, for every k and every cheater g, $$E\left[\sum_i \mu(yi):\{(x_i, y_i)\} \leftarrow g()\right] \geq k \Rightarrow \#(g) \geq \beta k.$$

The function $\{f_k\}$ is "incremental" if there exists an h-function C such that (1) #(C)=1; and (2) $f_{k+1}(x) = C(x, f_k(x))$ for all k (i.e., the distributions on both sides are identical).

The timing scheme $<\{f_k\}, \mu>$ is considered a "$\gamma$-timing scheme" (up to B) if it is incremental and $\alpha$-accurate (up to B) and $\beta$-uncheatable, where $\gamma = \alpha\beta$.

The function $\{f_k\}$ is "compact" if the size of $f_k(x)$ does not increase as k increases.

Simple Min Constructions

Let h have outputs in [1 ... N] for large N. Then a "simple min construction" for $\{f_k\}$ has the following general form: $f_k(x) = (j, h(L(x,j)))$ where $h(L(x,j)) = \min[h(L(x,1)), h(L(x,2)), \ldots, h(L(x,k))]$, and where L(x,i)=L(x',i') if and only if (x,i)=(x',i'). One example is L(x,i)=(x||i)). Another is $L(x,i)=(x||r_i||I)$ for random $r_j$. When L is probabilistic, the construction should also return $r_j$. Let H(N) be the harmonic function $H(N) = \Sigma^N_{i=1} 1/i \leq \ln(N)+1$. One possible estimation function for these constructions is $\mu(y) = N/_y H(N)$.

Let $f_k$ be our min construction, and let $\mu(y) = N/_y H(N)$. Then $<\{f_k\}, \mu>$ is a compact $(1-\epsilon-(\ln(N))^{-1})$-timing scheme up to $N^\epsilon$.

Many variations of this scheme are possible. For example, the inputs corresponding to the c smallest hash outputs could be returned, for some c>1. In addition, a new instance of the computation could be started whenever k reached a certain threshold (e.g., $N^r < N^\epsilon$), and the results from all instances could be returned. Other alternatives arise from various chained constructions, which allow tradeoffs of timing accuracy for cost of auditing. Alternatives for the estimation function $\mu$ also yield timing schemes with different error properties.

Hardware Components

It can be appreciated by one skilled in the art that any software programs, schemes, steps or algorithms described herein with reference to an embodiment of the invention can be implemented in either hardware or software. If implemented in software, these software programs, schemes, steps or algorithms can be implemented on any general purpose computer, such as a personal computer, or special purpose computer, such as a digital signal processor (DSP), having at a minimum a processor with sufficient processing speed, and a computer readable medium such as read-only memory (ROM), programmable ROM (PROM), erasable programmable ROM (EPROM), random access memory (RAM), hard drive, optical drive, floppy disk, and so forth.

Conclusion

Although a preferred embodiment is specifically illustrated and described herein, it will be appreciated that modifications and variations of the present invention are covered by the above teachings and within the purview of the appended claims without departing from the spirit and intended scope of the invention. For example, although one timing scheme F with details for one family of constructions was provided, it can be appreciated that any timing scheme F fulfilling the parameters set forth herein falls within the scope of the invention. Another example is that the metering program attached to information sent by server 24 to client 20 can be written in any portable language besides JAVA.

What is claimed is:

1. A metering apparatus for metering an elapsed time a client visits a server, comprising:

means for activating a webmeter in response to a start visit event initiated by the client;

means for deploying a metering program which attaches to information sent from the server to the client;

means for executing said metering program which computes a function F using a unique seed provided by said webmeter for each visit to said information, said metering program producing an auditable result at the end of each said visit;

means for deactivating said metering program in response to an end visit event initiated by the client, and for returning said auditable result to said webmeter; and means for verifying said auditable result matches said computation.

2. The metering apparatus defined in claim 1, wherein said function F implements a timing scheme to produce said auditable result, said timing scheme requiring an investment of computation power that can be estimated to within some known accuracy to measure a duration of each said visit.

3. The metering apparatus defined in claim 2, wherein said timing scheme is compact.

4. The metering apparatus defined in claim 2, wherein said timing scheme is accurate.

5. The metering apparatus defined in claim 2, wherein said timing scheme is uncheatable when implemented.

6. The metering apparatus defined in claim 2, wherein said timing scheme is incremental.

7. The metering apparatus defined in claim 2, wherein said visit is initiated by a start visit event, and ends in response to an end visit event.

8. The metering apparatus defined in claim 7, wherein the duration of said visit is defined as the length of time between said start visit event and said end visit event.

9. The metering apparatus defined in claim 1, further comprising a log keeper module for storing said result.

10. The metering apparatus defined in claim 2, further comprising an auditing module for auditing said result to ensure said result matches a known result for said investment of computation power.

11. The metering apparatus defined in claim 1, wherein said metering program is a JAVA applet.

12. A method for metering an elapsed time a client visits a server, comprising:

activating a webmeter in response to a start visit event initiated by the client;

deploying a metering program which attaches to information sent from the server to the client;

executing said metering program at the client to compute a timing function using a unique seed provided by said webmeter for each visit, said metering program producing an auditable result at the end of said visit;

deactivating said metering program in response to an end visit event initiated by the client, and returning said auditable result from the client to said webmeter; and verifying said auditable result matches said timing function computation.

13. The method defined in claim 12, wherein said timing function implements a timing scheme which requires an investment of computation power that can be estimated to within some known accuracy to measure the duration of each said visit.

14. The method defined in claim 13, wherein said timing scheme is compact.

15. The method defined in claim 13, wherein said timing scheme is accurate.

16. The method defined in claim 13, wherein said timing scheme is uncheatable when implemented.

17. The method defined in claim 13, wherein said timing scheme is incremental.

18. The method defined in claim 13, wherein said visit is initiated by a start visit event, and ends in response to an end visit event.

19. The method defined in claim 18, wherein the duration of said visit is defined as the length of time between said start visit event and said end visit event.

20. The method defined in claim 12, further comprising the step of storing said result.

21. The method defined in claim 13, further comprising the step of auditing said result to ensure said result matches a known result for said investment of computation power.

* * * * *